(12) United States Patent
Matsumoto (10) Patent No.: US 6,380,471 B2
(45) Date of Patent: Apr. 30, 2002

(54) MUSICAL SCORE DATA DISPLAY APPARATUS

(75) Inventor: Shuichi Matsumoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/814,204

(22) Filed: Mar. 21, 2001

(30) Foreign Application Priority Data

Mar. 22, 2000 (JP) ........................................ 2000-080353

(51) Int. Cl.$^7$ ............................................. G09B 15/02
(52) U.S. Cl. ................................................ 84/477 R
(58) Field of Search .......................... 84/470 R, 471 R, 84/477 R, 478, 479 A (56) References Cited

U.S. PATENT DOCUMENTS 5,728,960 A * 3/1998 Sitrick
5,746,605 A * 5/1998 Kennedy
5,894,100 A * 4/1999 Otsuka

* cited by examiner

Primary Examiner—Stanley J. Witkowski
(74) Attorney, Agent, or Firm—Morrison & Foerster (57) ABSTRACT

There is provided an apparatus for displaying musical score data in a display area. In the apparatus, a specifying device specifies a display range of original musical score data. An extracting device extracts musical score data included in the display range from the original musical score data and extracts musical information precluded from the display range but influencing the extracted musical score data from the original musical score data. A determining device determines whether a supplementary display is necessary or not in accordance with the specified display range. A setting device divides the display area into a main display area and an auxiliary display area when the supplementary display is necessary. A display device displays the extracted musical score data in the main display area and concurrently displays the extracted musical information in the auxiliary display area. The display area may be divided into a plurality of display sub areas. A display format is specified for each of the display sub areas in accordance with setting of the division of the display area. The original musical score data is processed to generate musical score data compliant with the display format.

13 Claims, 8 Drawing Sheets

MUSICAL SCORE DATA DISPLAY APPARATUS

BACKGROUND OF THE INVENTION

The present invention generally relates to a musical score data display apparatus, a musical score data display method, and a recording medium, which are suitable for effectively display various kinds of musical score data in a limited display area.

Conventional musical score data processing apparatuses usually have a display device. Some of these apparatuses display musical scores on a screen of the display device. Because the display area of the screen is limited and therefore the musical scores of one piece of music cannot be displayed all in one screen, hence a music progressive direction and a part score are scrolled in the direction of the parts. However, such a scroll-type display method may make it difficult for the user to surely view portions where clefs and time signatures for example are shown.

Some musical score data processing apparatuses are of the window type by which a musical score can be viewed in two or more formats at a time, such as staff, and piano role scores for example. However, the apparatuses of this type do not allow users to specify a display format as desired.

SUMMARY OF THE INVENTION

It is therefore an object of the present invention to provide a musical score data display apparatus capable of effectively displaying various kinds of musical score information within a limited display area (or window).

In carrying out the invention and according to a first aspect thereof, there is provided an apparatus for displaying musical score data in a display area. The apparatus comprises a specifying device that is provided for specifying a display range of original musical score data, an extracting device that is provided for extracting musical score data included in the display range from the original musical score data and for extracting musical information precluded from the display range but influencing the extracted musical score data from the original musical score data, a determining device that is provided for determining whether a supplementary display is necessary or not in accordance with the specified display range, a setting device that is provided for dividing the display area into a main display area and an auxiliary display area and setting the main display area and the auxiliary display area when the supplementary display is necessary, and a display device that is provided for displaying the extracted musical score data in the main display area and concurrently displaying the extracted musical information in the auxiliary display area.

Preferably, the setting device sets more than one auxiliary display area when the extracted musical information necessitates more than one auxiliary display area. The setting device may set the auxiliary display area at one of a left lower portion, a left upper portion and a right upper portion in the display area. The setting device may vertically scan the display range to effect a vertical division of the display area and may horizontally scan the display range to effect a horizontal division of the display area such that the vertical division and the horizontal division are conducted independently of one another to provide the auxiliary display area in accordance with the necessary supplementary display. Preferably, the extracting device extracts the musical information selected from clefs, key signatures, time signatures, repeat signs, tempo notations, cadence marks, octava, pedal marks, dynamic marks, sequence marks, expression marks, bar numbers, title, phrase marks, part names, lyrics, and page number.

In carrying out the invention and according to a second aspect thereof, there is provided an apparatus for displaying musical score data in a display area. The apparatus comprises a setting device that is provided for setting a division of the display area into a plurality of display sub areas, a specifying device that is provided for specifying a display format for each of the plurality of the display sub areas in accordance with the setting of the division of the display area, a generating device that is provided for processing original musical score data to generate therefrom musical score data compliant with the display format specified for each of the plurality of the display sub areas, and a display device that is provided for displaying the generated musical score data onto each of the plurality of the display sub areas in the specified display format.

Preferably, the display device can scroll the musical score data displayed in each of the plurality of the display sub areas in synchronization with each other. The setting device may set either of a vertical division of the display area into a plurality of vertical display sub areas and a horizontal division of the display area into a plurality of horizontal display sub areas. The specifying device may specify the display format with respect to at least one of a part arrangement, a score style, a data type, a transposition interval, a staff and font size, and a display color.

According to the first aspect of the present invention, a display range for musical score data is specified; musical score data belonging to the display range and information valid for the display range are extracted; whether auxiliary display is necessary or not is determined in accordance with the specification of the display range; a display area is divided into a main display area and an auxiliary display area and these display areas are set when the auxiliary display is found necessary; the extracted musical score data and the valid information are displayed in the main display area and the auxiliary display area, respectively. One or more auxiliary display area is set when the auxiliary display is found necessary. Thus, in the present invention, according to contents of the musical score to be displayed, it is determined whether the display area is divided into main and auxiliary display areas. If the auxiliary display area is arranged, necessary information is displayed in the auxiliary display area. Consequently, the necessary information can be always displayed in the display area. If the division of the display area is unnecessary, the auxiliary display area is not arranged, and the display area (window) is made effectively available for displaying the desired portion of the musical score.

According to the second aspect of the present invention, division of a display area (window) for displaying original musical score data into a plurality of display areas is specified; in response to the specification made by the division specification, a display format for each of the plurality of the display areas is specified; from the original musical score data, musical score data compliant with the display format specified for each of the plurality of the display areas are generated; and the generated musical score data are displayed onto each of the plurality of the display areas. The musical score data displayed in each of the plurality of the display areas are scrolled in synchronization with each other in the direction of time. Thus, the display area is divided into plural display areas and a display format is specifiable as desired for each display area, so that the user can view musical scores in any desired formats.

DETAILED DESCRIPTION OF THE INVENTION

This invention will be described in further detail by way of example with reference to the accompanying drawings. It should be noted that such description is for illustrative purposes only, and it is to be understood that changes and variations may be made without departing from the spirit or scope of the appended claims.

Hardware Configuration

Figure 1:
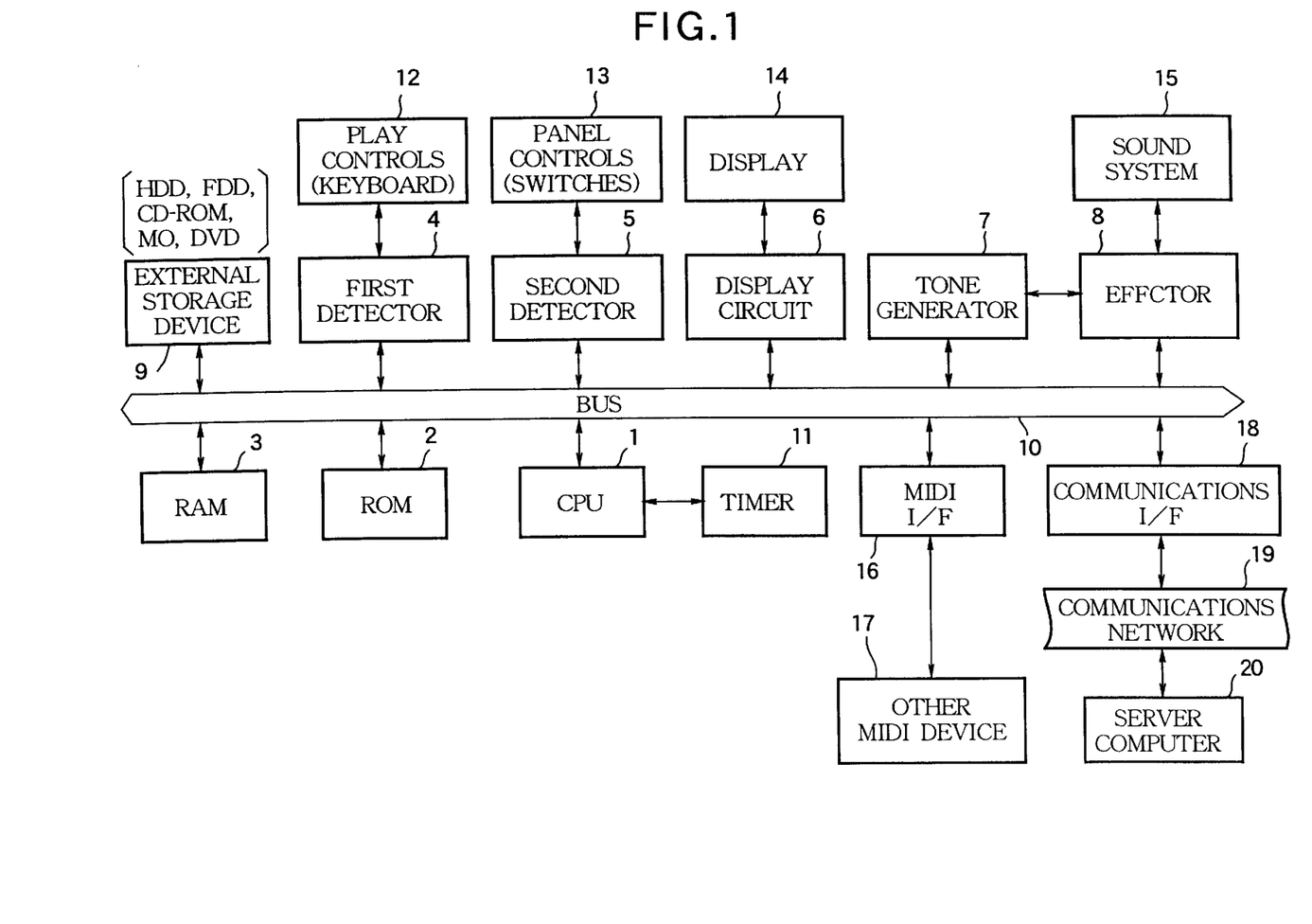
FIG. 1 is a block diagram illustrating a hardware configuration of a musical score data display processing apparatus practiced as one embodiment of the present invention.

FIG. 1 is a block diagram illustrating a hardware configuration of a musical score data display processing apparatus practiced as one embodiment of the present invention. In this example, this system comprises a central processing unit (CPU) 1, a read-only memory (ROM) 2, a random access memory (RAM) 3, a first and a second detectors 4 and 5, a display circuit 6, a tone generator 7, an effector 8, and an external storage device 9. These components 1 through 9 are interconnected through a bus 10, thereby constituting the data processing system for displaying musical score data.

The CPU 1 is provided for controlling the system in its entirety and has a timer 11 for generating a tempo clock and an interrupt clock for example, and further executes various control operations in accordance with a predetermined program, mainly a musical score data display processing functionality to be described later. The ROM 2 stores predetermined control programs for controlling this system, these control programs including various processing programs, various tables, and various data associated with the musical score data display processing according to the invention, in addition to basic music play information processing. The RAM 3 stores data and parameters necessary for the execution of these processing operations, and is used as a work area in which registers, flags, and data used in processing are temporarily held.

The first detector 4 is connected to a play controls device 12 having play controls such as a music keyboard for example. An operation switch device 13 connected to the second detector 5 has various controls for setting various modes, parameters, and operations. These controls include various switches as a mode specification button for musical score data display processing together with pointing devices such as a mouse arranged on an operator panel, an auxiliary display setting switch, a division specification switch, and various data selection/specification switches. These switches and buttons are generically referred to as "panel controls." The display circuit 6 has a display device 14 and various indicators, which may be arranged along the various controls on the operator panel of the switch device 13. On the display device 14, various graphic elements operable by such controls as a pointing device (a mouse) can be displayed. A sound system 15 connected to the effector 8 constituted by a DSP for example constitutes a sound output block together with the tone generator 7 and the effector 8.

The external storage device 9 is constituted by a hard disk drive (HDD), a Compact Disc read-only memory (CD-ROM) drive, a floppy disk drive (FDD), a magneto-optical (MO) disk drive, or a digital versatile disk (DVD) for example, and stores various control programs and various data. Therefore, the programs and data (musical score data for example) necessary for musical score data display processing can be read out from the external storage device 9 into the RAM 3 in addition to the use of the ROM 2, and the results of the processing can be stored in the external storage device 9 as required.

In the present example, a MIDI interface (I/F) 16 is connected to the bus 10, thereby allowing the system to communicate with other MIDI devices 17. Further, a communications interface 18 is connected to the bus 10, thereby allowing the system to store control programs and various data from a server computer 20 into the external storage device 9 through a communications network 19.

Overview of System Functionality According to Embodiment 1

Figure 2:
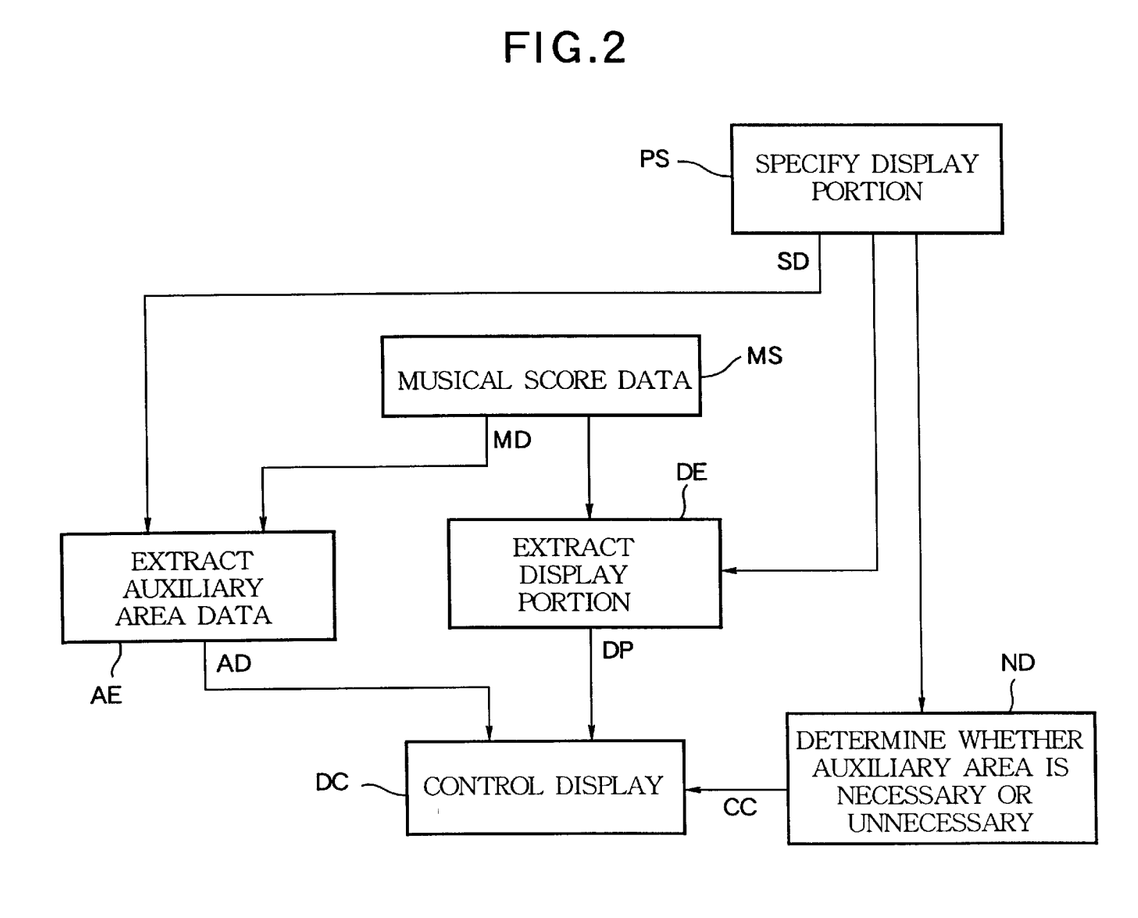
FIG. 2 is a block diagram illustrating a functional outline of the data processing system for musical score data display according to the embodiment of the present invention.

FIG. 2 is a block diagram illustrating a functional outline of a data processing system for musical score data display according to an embodiment 1 of the present invention. In short, in this processing system, as shown in FIG. 2, when a display range SD is specified (PS) for original musical score data MD, musical score data DP belonging to the display range SD and information AD valid for the display range SD are extracted (DE, AE), and it is determined whether to perform auxiliary display in accordance with the specification of the display range SD (ND). Next, if the auxiliary display is to be made, a display area (window) is divided into a main display area and an auxiliary display area (ND), the extracted musical score data DP and the extracted information AD being displayed in the main display area and the auxiliary display area, respectively (DC). The following describes the functionality of each of these blocks constituting this data processing system.

The musical score data supply block MS supplies the original musical score data MD to the display portion extracting block DE and the auxiliary area data extracting block AE. The musical score data MD are extracted for use in displaying a musical score, which is originally rigid data having no timing variation for example. It should be noted that a musical score may be displayed on the basis of play data for musical performance having a timing variation; in such a case, the play data serves as musical score data.

For the musical score data MD, various data formats are available. In one example, "type of note+pitch (or type of rest)" are arranged in a time-dependent manner. Another example is image data such as bit map data. The musical score data MD are formed by data of plural tracks corresponding to plural musical instrument parts. It should be noted that the musical score data MD are usually stored on the external storage device 9 or the ROM 2 or the RAM 3; the musical score data MD may also be supplied from the external MIDI device 17 or the server computer 20 via the interfaces 16 and 18. Alternatively, the musical score data may be inputted in the system from the play controls 12 or the panel controls 13.

The display portion specification block PS specifies such portions of the musical score data to be displayed as a display range along time axis and a part among plural parts to be displayed, and outputs the display portion specification information SD to the display portion extracting block DE, the auxiliary area data extracting block AE, and the auxiliary area determination block ND. The specification of display portions is executed by means of a horizontal scroll bar (along time axis) and a vertical scroll bar (along music parts) of the display area, namely the musical score display window on the display screen of the display 14 for example. Alternatively, this specification may be performed by making reproduction of the score on the basis of the musical score data MD or separately prepared play data while sequentially updating the portions to be displayed as the reproduction proceeds.

In the display portion extracting block DE, the specified area along the time axis and a portion of the musical score data MD corresponding to the part to be displayed are extracted as partial musical score data DP from the original musical score data MD in accordance with the display portion specification information SD supplied from the display portion specification block PS, and passes the extracted data to the display control block DC.

In the auxiliary area data extracting block AE, the auxiliary display data AD to be displayed in the auxiliary display area (which may be abbreviated as an auxiliary area) on the screen (or window) of the display 14 are extracted from the original musical score data MD in accordance with the specification information SD supplied from the display portion specification block PS, and the extracted auxiliary display data AD are passed to the display control block DC. The auxiliary display data AD include clefs (G clef, F clef, etc.), key signatures (sharp "#" and flat "b"), time signatures (4/4, etc.), repeat signs (dal segno, etc.), tempo marks (allegro, ritardando, etc.), cadence marks (fermata, etc.), and octava, for example. Of these data, to be displayed at the left end are clefs, key signatures, and time signatures, and to be displayed at the top are repeat signs, tempo marks, and cadence marks. It should be noted that, among the auxiliary display data AD, time-dependent information which is valid (the information immediately before the specified part) in the data portion specified by the display portion specification block PS is extracted.

The auxiliary area determination block ND determines whether to divide the display area (window) for providing auxiliary area display in accordance with the display portion specified by the specification information SD supplied from the display portion specification block PS, and outputs the resultant determination information CC to the display control block DC. When the division is permitted by the operation of the auxiliary display setting switch on the panel controls 13, it is determined that horizontal division is not made if the information to be displayed is already included in the auxiliary area left-side portion (composed of a lower left auxiliary display area LL and an upper left auxiliary display area LU to be described later) in the display portion along time axis; otherwise, it is determined that the horizontal division is made. Also, in the display portion along the part direction, if the information to be displayed is already included in the auxiliary area upper portion (an upper right auxiliary display area RU), it is determined that vertical division is not made; otherwise, it is determined that vertical division is made. For the auxiliary area upper left portion (the upper left auxiliary display area LU), creation of the auxiliary display area upper left portion is instructed to the display control block DC when the horizontal or vertical division is determined.

Display modes in embodiment 1

Figure 3:
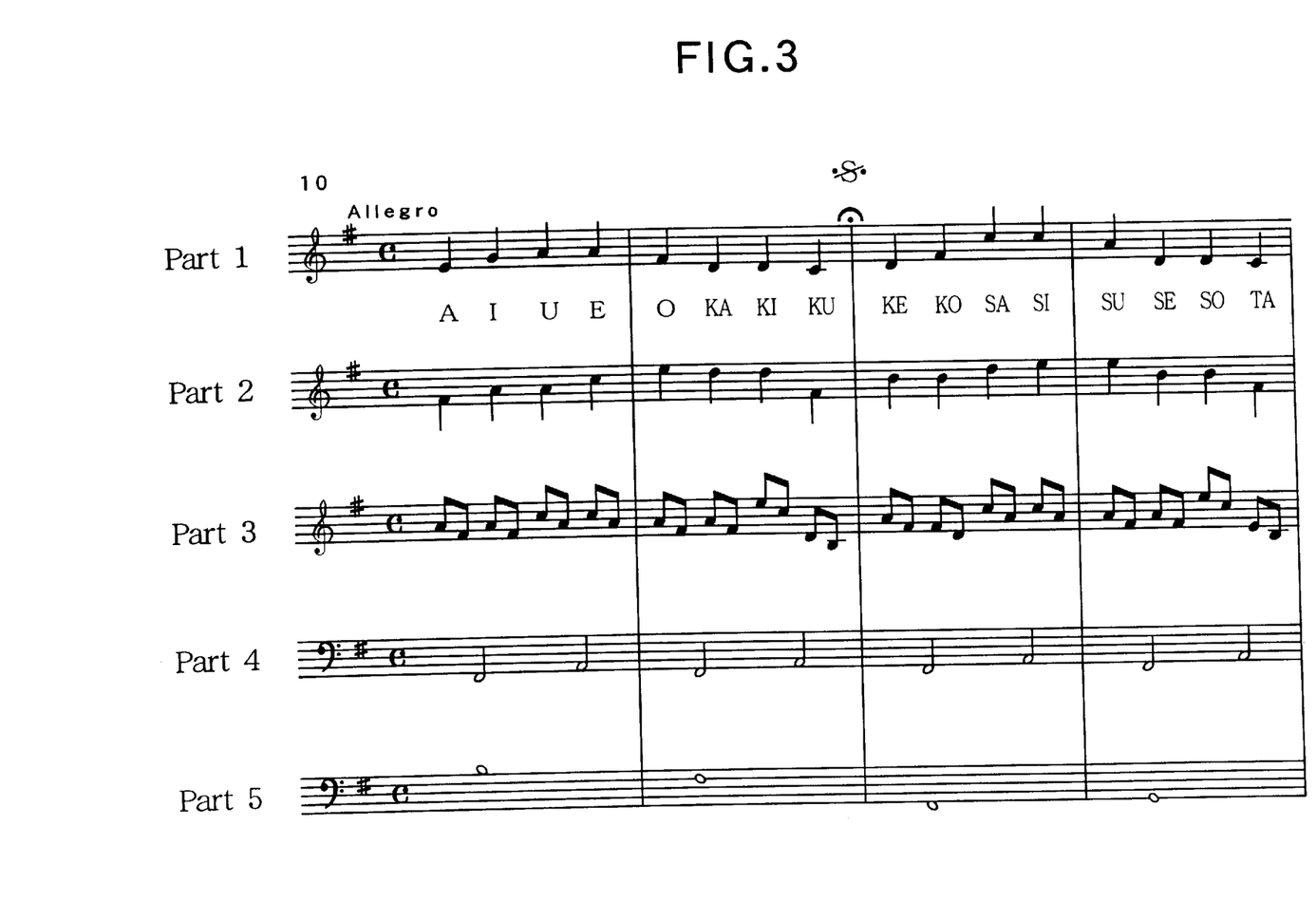
FIG. 3 is a diagram illustrating an example of an original musical score to which the present invention is applicable.

With a normal musical score, the left end thereof is entered with such information affecting each part as part name, clef, and key signature. The upper portion of the score is entered with such information valid for a bar common for all parts as tempo, expression marks, and sequence symbols (segno, coda mark, etc.). In addition, if a musical score is enlarged for detail view in order to adjust symbol positions or the number of staffs increases as with a large orchestral score for example, all the score information cannot be accommodated in the display area. FIG. 3 shows an example of such a large score.

Figure 4:
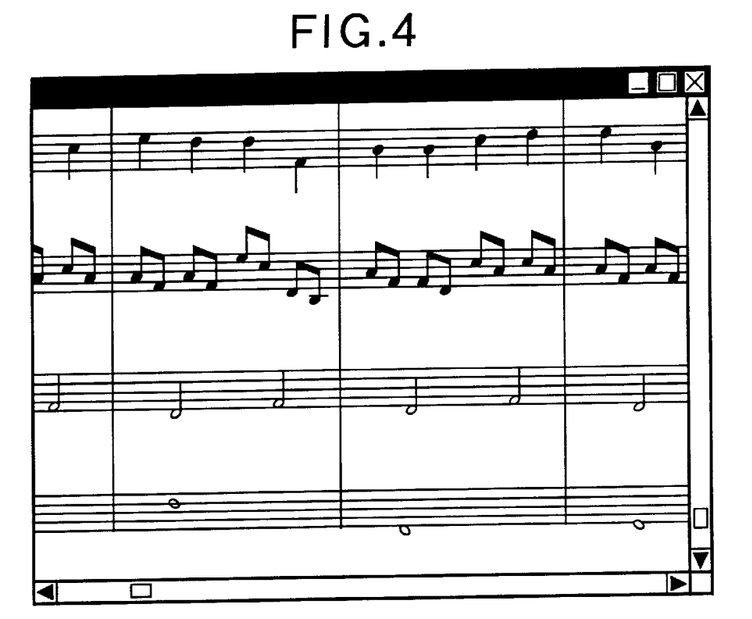
FIG. 4 is a diagram illustrating an example of displaying a musical score according to a conventional method.

FIG. 4 shows a conventional method of displaying only a necessary portion of a musical score by scrolling. In this method, when a bar midway in the score is to be viewed for editing by scrolling the score along time axis (namely, horizontally), the portion to be edited may be incorrectly taken because only the midway portion is displayed. Otherwise, when a lower part is edited, the screen must be scrolled in the direction of parts (namely, vertically) to make confirmation of the information arranged in the upper portion. Actually, screen scrolling is slow and therefore frustrating.

Figure 5:
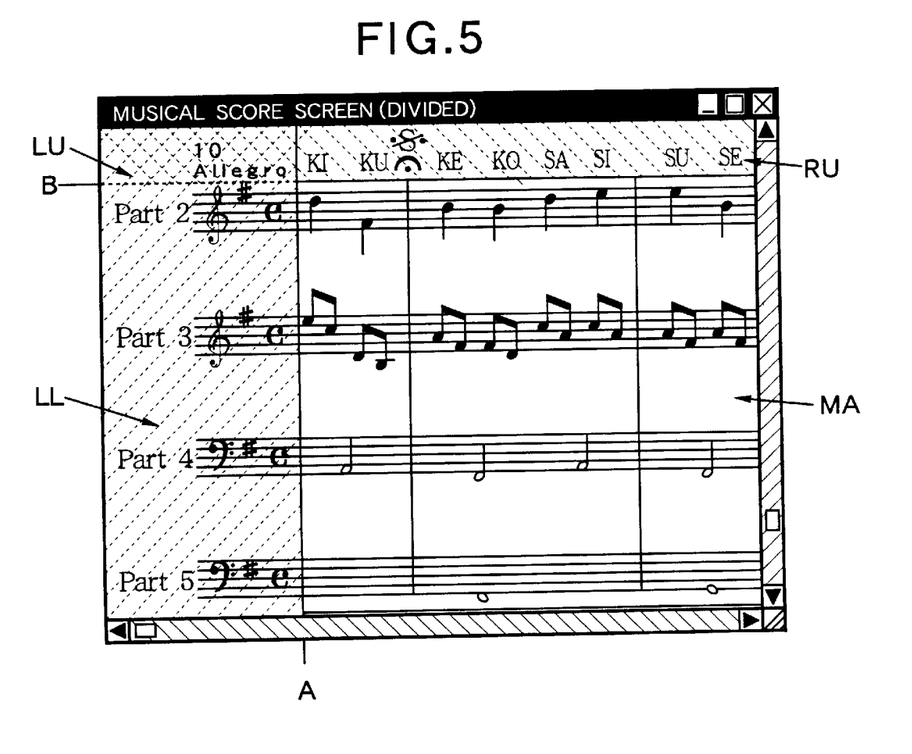
FIG. 5 is a diagram illustrating an example of displaying musical score data according to the embodiment of the present invention.

On the other hand, in the embodiment 1 of the present invention, the display area (window) of the screen on the display device is divided in accordance with a predetermined condition into a main display area for displaying the desired score portion and an auxiliary display area for displaying the predetermined information associated with the desired score portion. Therefore, the user can recognize the effective information from the display areas regardless of the position to be edited, and can continue editing operation without switching between displays, thereby minimizing the chance of making a mistake and enhancing the efficiency of editing. FIG. 5 illustrates one example of score display in the display area (window) on the screen of the display in the musical score data display processing system according to the embodiment 1 of the present invention.

For example, if the user specifies the displaying of the auxiliary area by operating the auxiliary display setting switch on the panel controls 13 for example and the horizontal and vertical divisions are determined by the auxiliary area determination block ND, the auxiliary display area composed of the lower left auxiliary display area LL, the upper left auxiliary display area LU, and the upper right auxiliary display area RU appears as shown in FIG. 5 outside the main display area MA. In these auxiliary display areas, the predetermined information associated with the score portion viewed in the main display area MA is displayed.

Figure 6:
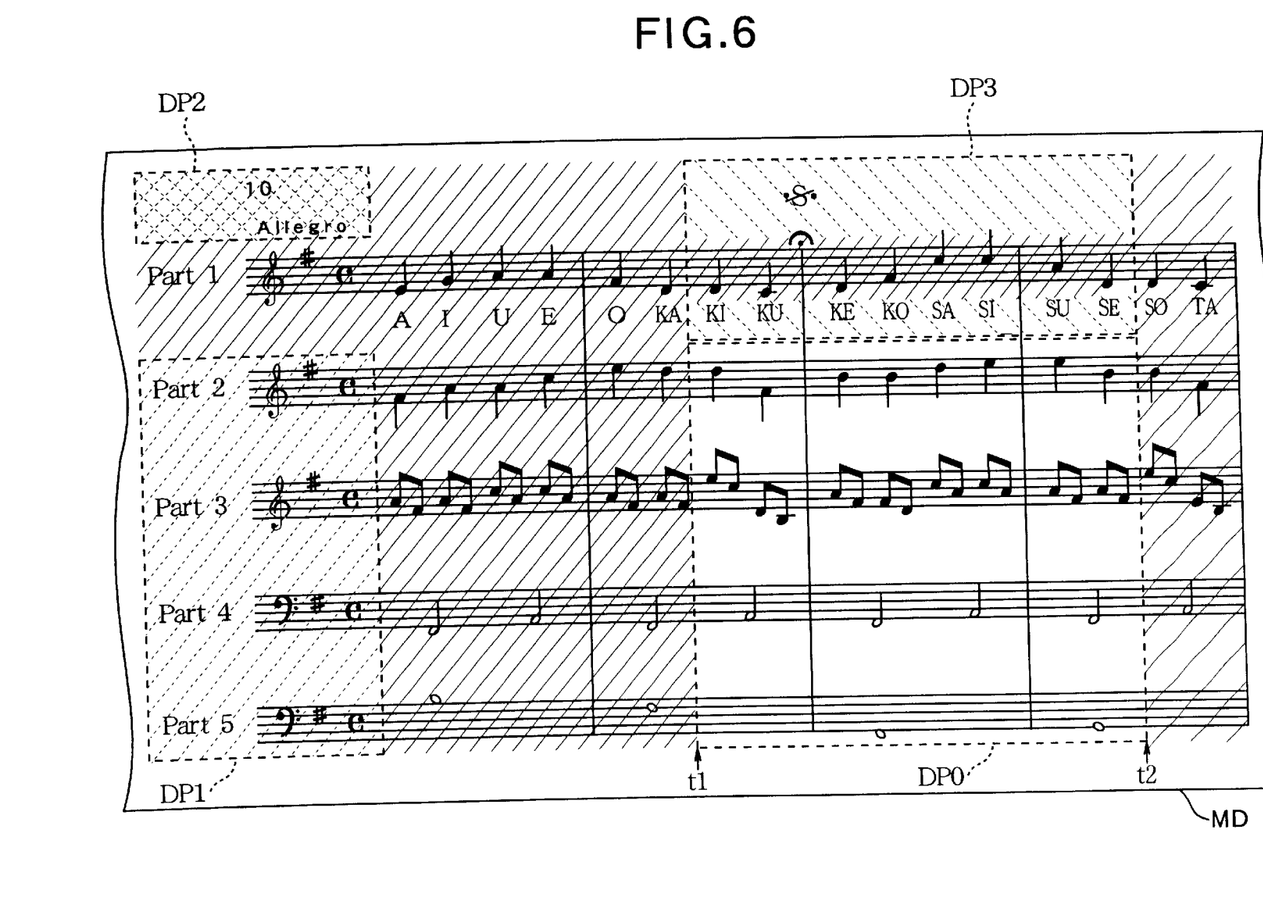
FIG. 6 is a diagram illustrating a method of displaying the musical score data shown in FIG. 5 according to the embodiment of the present invention.

FIG. 6 illustrates the method of displaying musical score data according to the embodiment 1 of the present invention as shown in FIG. 5. In the example shown in FIG. 6, if musical score data MD within a range starting with display start time t1 and display part 2 are to be displayed on the display area (window) on the display 14, there are, as auxiliary display data AD valid for this display range, part numbers (parts 2 trough 5), clefs, key signatures, and time signatures on the left side, a page number (10) and a tempo notation in the upper left side, and repeat signs and lyrics on the top side. However, these information is not included in the musical score data of the range to be displayed. In such a case, the auxiliary area determination block ND determines that the display area be divided horizontally and vertically. In accordance with the determination for dividing the display area, the musical score data MD in main display range DP0 between the display start time t1 and the display end time t2 are displayed in the main display area MA as shown in FIG. 5, and the auxiliary display data AD in a first auxiliary range DP1, a second auxiliary range DP2, and a third auxiliary range DP3 are displayed in the lower left auxiliary display area LL, the upper left auxiliary display area LU, and the upper right auxiliary display area UR, respectively.

Figure 7:
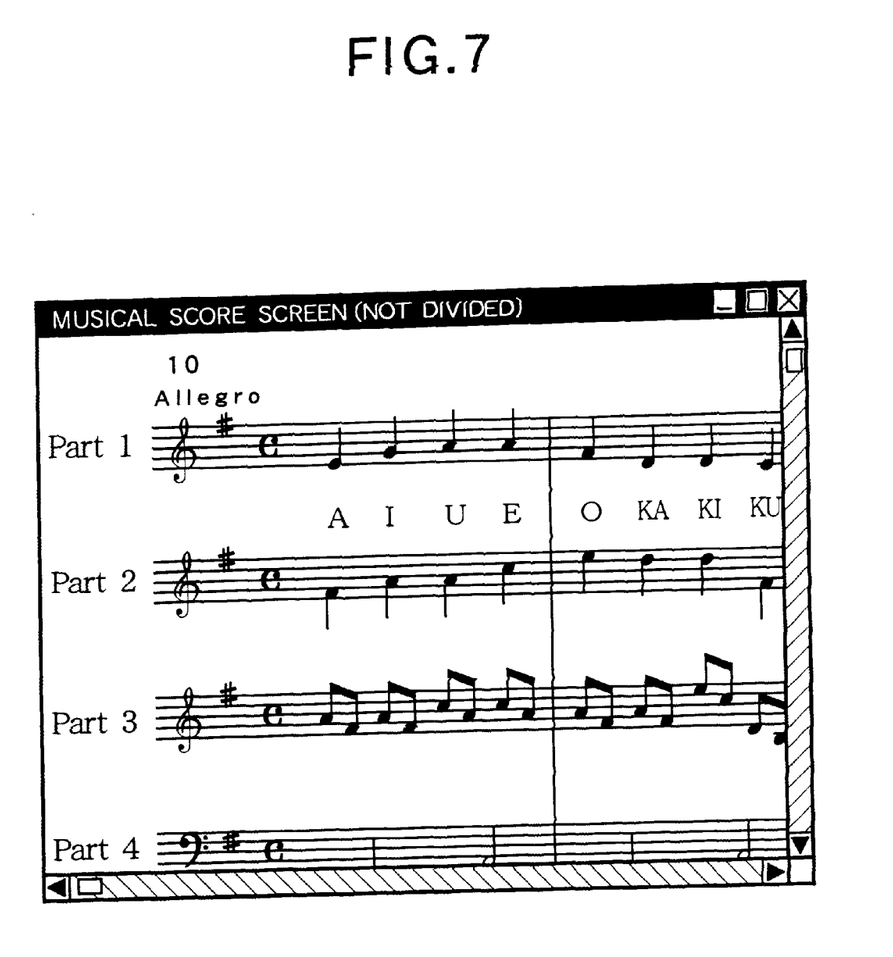
FIG. 7 is a diagram illustrating another example of displaying the musical score data according to the embodiment of the present invention.

If the musical score data MD in the upper right (including top and left end) of the musical score example shown in FIG. 6 are to be displayed, the auxiliary area determination block ND determines that the division is unnecessary regardless of the instruction for providing auxiliary display because the auxiliary display data AD valid for this range are all included in the specified range. Therefore, in this case, the musical score data MD in the range to be displayed are displayed in the sole display area (window) as shown in FIG. 7. It should be noted that, if an instruction is given by operating the auxiliary display setting switch for example that the auxiliary area be not displayed, the musical score data are fully displayed in the sole display area.

In the embodiment 1 of the present invention, the auxiliary display area is arranged as described above for displaying the auxiliary display data AD. This allows the user to recognize the information valid for the display area wherever the portion under editing is in a page and allows the user to continue the editing operation without switching between displays, thereby minimizing the chance of making a mistake and enhancing the efficiency of editing. In addition, if there is no information to be displayed in the auxiliary area, the auxiliary area need not be displayed, thereby allowing the effective use of the display area (window).

Items which can provide the auxiliary display data AD valid for the musical score data (the main display range DP0) displayed in the main display area are listed below. For the auxiliary display data AD, any of the following items may be selected as required:

(a) clef, key signature, time signature, and bracket;

(b) (detached) octaver, slur, and tie;

(c) pedal mark and dynamic mark;

(d) sequence mark, tempo notation, and expression mark;

(e) bar number, title, and phrase mark;

(f) part name;

(g) lyrics; and (h) page number, etc.

It should be noted that the items to be displayed in the auxiliary display area may be preset or separately specified. Further, the display position of the auxiliary area may be preset, or may be separately positioned as desired in the bottom or the right side, for example.

As described above, the inventive apparatus is provided for displaying musical score data in a display area. In the inventive apparatus shown in FIG. 2, a specifying device is provided in the form of the block PS for specifying a display range of original musical score data. An extracting device is provided in the form of the blocks DE and AE for extracting musical score data included in the display range from the original musical score data and for extracting musical information precluded from the display range but influencing the extracted musical score data from the original musical score data. A determining device is provided in the form of the block ND for determining whether a supplementary display is necessary or not in accordance with the specified display range. A setting device is provided in the form of the block DC for dividing the display area into a main display area and an auxiliary display area and setting the main display area and the auxiliary display area when the supplementary display is necessary. The display device 14 displays the extracted musical score data in the main display area and concurrently displays the extracted musical information in the auxiliary display area.

Preferably, the setting device sets more than one auxiliary display area when the extracted musical information necessitates more than one auxiliary display area. The setting device may set the auxiliary display area at one of a left lower portion, a left upper portion and a right upper portion in the display area. The setting device may vertically scan the display range to effect a vertical division of the display area and may horizontally scan the display range to effect a horizontal division of the display area such that the vertical division and the horizontal division are conducted independently of one another to provide the auxiliary display area in accordance with the necessary supplementary display. Preferably, the extracting device extracts the musical information selected from clefs, key signatures, time signatures, repeat signs, tempo notations, cadence marks, octava, pedal marks, dynamic marks, sequence marks, expression marks, bar numbers, title, phrase marks, part names, lyrics, and page number.

Overview of system functionality according to embodiment 2

Figure 8:
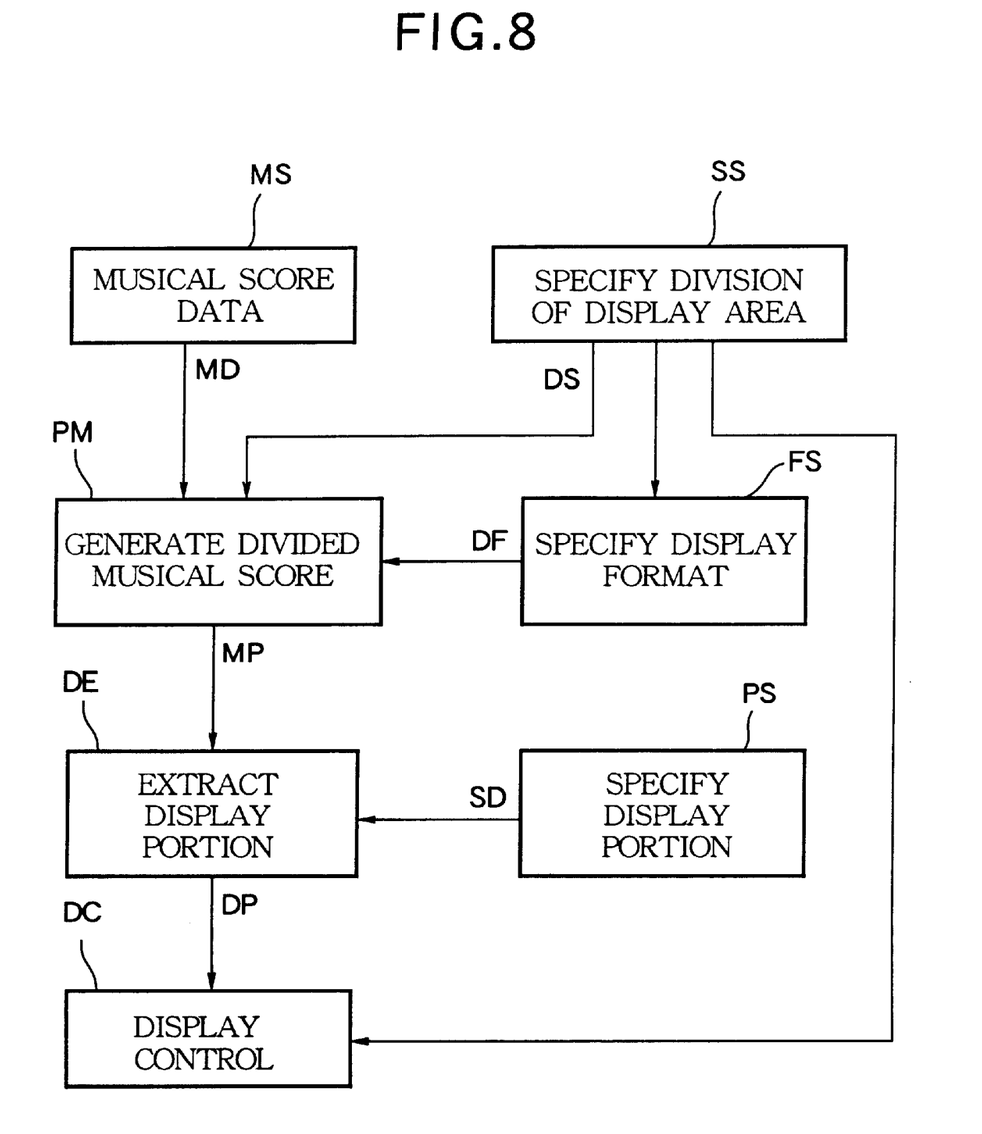
FIG. 8 is a functional block diagram illustrating the capabilities of the musical score data display processing system according to another embodiment of the present invention.

FIG. 8 is a functional block diagram outlining the functionality of a data processing system for displaying musical score data according to an embodiment 2 of the present invention. For summary, in this processing system, when a display format DF of each display area is specified (FS) according to the specification DS for dividing a display area (window) into plural display areas (SS), musical score data MP are generated from the original musical score data MD in accordance with the display format DF specified for each display area (PM), and the generated musical score data MP (DP) are displayed in each display area (DC). The following describes the function of each of these blocks of this data processing system.

A musical score data supply block MS supplies the original musical score data MD as with the embodiment 1 to a divided musical score generating block PM. A display area division specification block SS specifies the division of a display area (window) into plural sub display areas or frames as well as a mode of the division, and outputs the division specification information DS. The mode of division is such as "divide into three vertical areas,"" divide into two horizontal areas," "or divide into two vertical areas and divide the left area further into two horizontal areas" for example. In this case, it is preferable that the width of each divided area be also specified. The division modes may be specified by a command or through a GUI.

A display format specification block FS specifies a format of a musical score to be displayed in each divided display area, and outputs the format specification information DF. The specifiable formats include part type (only part 1, all parts, and so on), display style (staff, tablature (used especially for stringed instruments, also called "TAB score"), piano role score, lyrics, and drum score), data type (note, velocity, program change, and so on), transposition, staff and font size, display color, and so on. The division modes and the display formats to be specified in the blocks SS and FS may be contained in the musical score data MD (namely, they may be provided as default formats beforehand or specified later by the user).

On the basis of the division specification information DS supplied from the display area division specification block SS and the format specification information DS supplied from the display format specification block FS, the divided musical score generating block PM generates, from the original musical score data MD, divided musical score data MP corresponding to the number of divisions of display area specified by the division specification information DS and the formats specified by the format specification information DF. If a display format (or display style) is specified, which cannot be displayed directly from the original musical score data, as with a tablature score and a piano role score for example, the original data is converted into the data of the specified format.

As with the embodiment 1, a display portion specification block PS specifies a portion of the musical score data MD to be displayed in terms of a range along time axis and a part among plural parts to be displayed for example, and outputs display portion specification information SD. As with the embodiment 1, a display portion extraction block DE extracts, in accordance with the display portion specification information SD, data in the specified range along time axis from the divided musical score data MP supplied from the divided musical score generating block PM as partial musical score data DP, and passes the extracted partial musical score data DP to a display control block DC.

According to the contents of the division specification information supplied from the display area division specification block SS, the display control block DC divides the display area into plural sub display areas, and displays the partial musical score data DP generated in the division musical score generating block PM and extracted in the display portion extraction block DE onto each divided display area.

Display modes in embodiment 2

Figure 9:
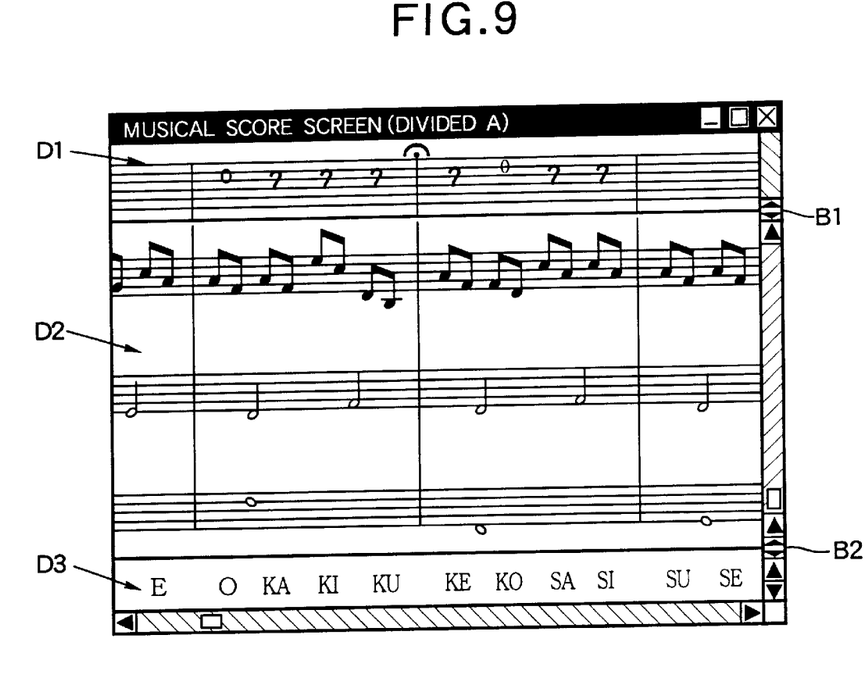
FIG. 9 is a diagram illustrating an example of displaying a musical score according to the embodiment of the present invention.
Figure 10:
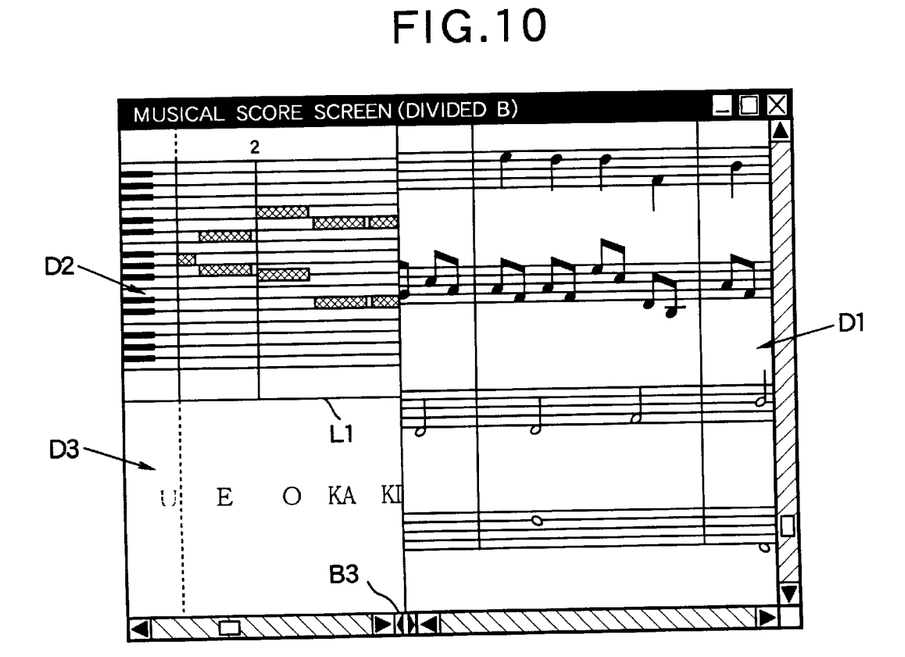
FIG. 10 is a diagram illustrating another example of displaying the musical score according to the embodiment of the present invention.

FIG. 9 and FIG. 10 illustrate examples of musical score display in the embodiment 2 of the present invention. In the musical score example shown in FIG. 9, the display area (window) is divided into three horizontal display areas D1 through D3. In the first display area D1, a tablature score is displayed. In the second display area D2, a normal score (staff) is displayed. In the third display are D3, lyrics are displayed. The musical score data displayed in these display areas D1 through D3 can be scrolled (moved) in synchronization with each other in the time direction (horizontally) by an automatic scroll capability in response to a scroll button operation or music play progression. In the vertical direction, these display areas can be scrolled independently. It should be noted that the widths of these display areas D1 through D3 can be changed by boundary buttons B1 and B2 corresponding to the boundaries between the display areas or by vertically dragging the boundaries themselves.

In the embodiment 2 of the present invention, plural pieces of musical score data are displayed in the plural display areas D1 through D3 in the display area (window) with different display formats. This arrangement allows the user to use both of a display format (or display style) which is easy in executing an editing job and another display format (or display style) which is easy in executing a confirmation job, and allows the user to simultaneously execute the jobs in both of the areas and, simultaneously display a display style (tab score) which is easy in play, and another display style (the staff). If each score display portion has a display parameter, transposition by use of the display parameter in advance allows the user to make confirmation of an interval (namely, cancellation of an interval) on a transposing instrument, or allows the user to edit one part while viewing other parts. Displaying the lyrics in a divided manner as shown in FIG. 9 allows the user to set the size as desired, thereby enhancing the visibility of the musical score data and providing display in which score indication is synchronized with karaoke-style wipe of lyrics.

The display area may also divided in the direction of time in the case where the time may be independent for each display area or the times of all display areas may be interlocked. In the musical score example shown in FIG. 10, the display area is divided into a left-side area and a right-side area, the left-side area is further divided into an upper area and a lower area to which the second and third display areas D2 and D3 are set respectively, and the first display area D1 is set to the right-side display area. In this example, a score is displayed in the first display area D1 and a corresponding piano role score and lyrics are displayed in the second and third display areas D2 and D3, respectively. The score in the first display area D1, the piano role score in the second display area D2, and the lyrics in the third display area D3 are controlled in an interlocking manner so that they move in synchronization. The scroll buttons for time direction (horizontal direction) are also interlocked. It should be noted that the time widths of the display areas D1 through D3 can be changed by use of the boundary button B3 between the display area D1 and the display areas D2 and D3 or by dragging the boundary line itself horizontally. The vertical widths of the display areas D2 and D3 can be changed by vertically dragging a boundary line L1 between the display areas D2 and D3.

As described above, according to the second embodiment, the inventive apparatus is provided for displaying musical score data in a display area. In the inventive apparatus shown in FIG. 8, a setting device is provided in the form of the block SS for setting a division of the display area into a plurality of display sub areas. A specifying device is provided in the form of the block FS for specifying a display format for each of the plurality of the display sub areas in accordance with the setting of the division of the display area. A generating device is provided in the form of the block PM for processing original musical score data to generate therefrom musical score data compliant with the display format specified for each of the plurality of the display sub areas. A display device is provided in the form of the block DC for displaying the generated musical score data onto each of the plurality of the display sub areas in the specified display format.

Preferably, the display device can scroll the musical score data displayed in each of the plurality of the display sub areas in synchronization with each other. The setting device may set either of a vertical division of the display area into a plurality of vertical display sub areas and a horizontal division of the display area into a plurality of horizontal display sub areas. The specifying device may specify the display format with respect to at least one of a part arrangement, a score style, a data type, a transposition interval, a staff and font size, and a display color.

Various other embodiments

The musical data display processing apparatus according to the present invention may be practiced in various other modes. For example, the system may be installed not only in an electronic musical instrument, but also a personal computer plus application software. If the system is based on an electronic musical instrument, it may be not only a keyboard instrument but also a stringed instrument, a wind instrument, a percussion instrument, and so on. Further, the system may be installed in an electronic musical instrument with a tone generator and an automatic play apparatus for example built in, or the system may be composed of a discrete tone generator and a discrete automatic play apparatus which are interconnected by communications means such as MIDI and various networks. The processing programs and the data for use by the system may be supplied directly from external storage media or external devices via a communication interface into the electronic musical instrument or the personal computer that constitutes the system.

As for automatic play functionality, any of the following play data formats is available: "event+relative time" in which a play event occurrence time is expressed in a time from the last event; "event+absolute time" in which a play event occurrence time is expressed in an absolute time in a piece of music or a bar; "pitch (rest)+note length" in which play data are expressed in pitch and length of note or rest and rest length; and "solid scheme" in which a memory area is allocated for each minimum play resolution and a play event is stored in the memory area corresponding to a play event occurrence time. It should be noted that, in the above-mentioned embodiments, a play event includes a note event and a rest event for example; absence of a note event may replace a rest event, thereby omitting the rest event.

Automatic play data for plural channels may be stored in a form where data for plural channels exist in a mixed manner or in another form where the data of each channel are arranged for each track. In the system memory, time-dependent play data and link information may be stored in continues areas, or data stored in scattered areas may be separately managed as continuous data (namely, the data may only be managed as data continuous in a time-dependent manner and therefore whether the data are stored continuously in memory makes no difference).

MIDI interface may be configured by use of not only a dedicated MIDI interface, but also a general-purpose interface such as RS-232C, USB (Universal Serial Bus), or IEEE (Institute of Electrical and Electronics Engineers) 1394. In this case, data other than MIDI messages may be transferred at the same time.

As mentioned above and according to the first aspect of the invention, a display range for musical score data is specified; musical score data belonging to the display range and information valid for the display range are extracted; whether auxiliary display is necessary or not is determined in accordance with the specification of the display range; a display area is divided into a main display area and an auxiliary display area and these display areas are set when the auxiliary display is found necessary; the extracted musical score data and the information are displayed in the main display area and the auxiliary display area, respectively. One or more auxiliary display areas are set when the auxiliary display is found necessary. Thus, in the present invention, according to a musical score portion to be displayed, it is determined whether the display area is divided into main and auxiliary display areas. If the auxiliary display area is arranged, necessary information is displayed in the auxiliary area. Consequently, the necessary information can be always displayed in the display area. If the division of the display area is unnecessary, the auxiliary display area is not arranged and the sole display area (window) is made effectively available for displaying a desired musical score.

According to the second aspect of the present invention, division of a display area (window) for displaying musical score data into a plurality of display areas is specified; in response to the specification made by the division specification, a display format for each of the plurality of display areas is specified; from the original musical score data, musical score data compliant with the display format specified for each of the plurality of display areas are generated; and the generated musical score data are displayed onto each of the plurality of the display areas. The musical score data displayed in each of the plurality of the display areas are scrolled in synchronization with each other in the direction of time. Thus, the display area is divided into plural display areas and a display format is specifiable as desired for each display area, so that the user can view musical scores in any desired format.

What is claimed is:

1. An apparatus for displaying musical score data in a display area, comprising:

a specifying device that is provided for specifying a display range of original musical score data;

an extracting device that is provided for extracting musical score data included in the display range from the original musical score data and for extracting musical information precluded from the display range but influencing the extracted musical score data from the original musical score data;

a determining device that is provided for determining whether a supplementary display is necessary or not in accordance with the specified display range;

a setting device that is provided for dividing the display area into a main display area and an auxiliary display area and setting the main display area and the auxiliary display area when the supplementary display is necessary; and a display device that is provided for displaying the extracted musical score data in the main display area and concurrently displaying the extracted musical information in the auxiliary display area.

2. The apparatus according to claim 1, wherein the setting device sets more than one auxiliary display area when the extracted musical information necessitates more than one auxiliary display area.

3. The apparatus according to claim 1, wherein the setting device sets the auxiliary display area at one of a left lower portion, a left upper portion and a right upper portion in the display area.

4. The apparatus according to claim 1, wherein the setting device vertically scans the display range to effect a vertical division of the display area and horizontally scans the display range to effect a horizontal division of the display area such that the vertical division and the horizontal division are conducted independently of one another to provide the auxiliary display area in accordance with the necessary supplementary display.

5. The apparatus according to claim 1, wherein the extracting device extracts the musical information selected from clefs, key signatures, time signatures, repeat signs, tempo notations, cadence marks, octava, pedal marks, dynamic marks, sequence marks, expression marks, bar numbers, title, phrase marks, part names, lyrics, and page number.

6. An apparatus for displaying musical score data in a display area, comprising:

a setting device that is provided for setting a division of the display area into a plurality of display sub areas;

a specifying device that is provided for specifying a display format for each of the plurality of the display sub areas in accordance with the setting of the division of the display area;

a generating device that is provided for processing original musical score data to generate therefrom musical score data compliant with the display format specified for each of the plurality of the display sub areas; and a display device that is provided for displaying the generated musical score data onto each of the plurality of the display sub areas in the specified display format.

7. The apparatus according to claim 6, wherein the display device can scroll the musical score data displayed in each of the plurality of the display sub areas in synchronization with each other.

8. The apparatus according to claim 6, wherein the setting device sets either of a vertical division of the display area into a plurality of vertical display sub areas and a horizontal division of the display area into a plurality of horizontal display sub areas.

9. The apparatus according to claim 6, wherein the specifying device specifies the display format with respect to at least one of a part arrangement, a score style, a data type, a transposition interval, a staff and font size, and a display color.

10. A method of displaying musical score data in a display area, comprising the steps of:

specifying a display range of original musical score data;

extracting musical score data included in the display range from the original musical score data and extracting musical information precluded from the display range but influencing the extracted musical score data from the original musical score data;

determining whether a supplementary display is necessary or not in accordance with the specified display range;

dividing the display area into a main display area and an auxiliary display area and setting the main display area and the auxiliary display area when the supplementary display is necessary; and displaying the extracted musical score data in the main display area and concurrently displaying the extracted musical information in the auxiliary display area.

11. A method of displaying musical score data in a display area, comprising the steps of:

setting a division of the display area into a plurality of display sub areas;

specifying a display format for each of the plurality of the display sub areas in accordance with the setting of the division of the display area;

processing original musical score data to generate therefrom musical score data compliant with the display format specified for each of the plurality of the display sub areas; and displaying the generated musical score data onto each of the plurality of the display sub areas in the specified display format.

12. A medium for use in a display apparatus having a processor for displaying musical score data in a display area, the medium containing program instructions executable by the processor for causing the display apparatus to perform a process comprising the steps of:

specifying a display range of original musical score data;

extracting musical score data included in the display range from the original musical score data and extracting musical information precluded from the display range but influencing the extracted musical score data from the original musical score data;

determining whether a supplementary display is necessary or not in accordance with the specified display range;

dividing the display area into a main display area and an auxiliary display area and setting the main display area and the auxiliary display area when the supplementary display is necessary; and displaying the extracted musical score data in the main display area and concurrently displaying the extracted musical information in the auxiliary display area.

13. A medium for use in a display apparatus having a processor for displaying musical score data in a display area, the medium containing program instructions executable by the processor for causing the display apparatus to perform a process comprising the steps of:

setting a division of the display area into a plurality of display sub areas;

specifying a display format for each of the plurality of the display sub areas in accordance with the setting of the division of the display area;

processing original musical score data to generate therefrom musical score data compliant with the display format specified for each of the plurality of the display sub areas; and displaying the generated musical score data onto each of the plurality of the display sub areas in the specified display format.

* * * * *